United States Patent [19]

Leuthold et al.

[11] Patent Number: 5,487,608
[45] Date of Patent: Jan. 30, 1996

[54] SINGLE PLATE HYDRODYNAMIC BEARING WITH SELF-BALANCING FLUID LEVEL AND FLUID CIRCULATION

[75] Inventors: Hans Leuthold; David J. Jennings, both of Santa Cruz; Wesley R. Clark, Watsonville; Raquib Khan, Pleasanton; Guenther Heine, Aptos, all of Calif.

[73] Assignee: Seagate Technology, Inc., Scotts Valley, Calif.

[21] Appl. No.: 278,754

[22] Filed: Jul. 22, 1994

[51] Int. Cl.⁶ ..................................... F16C 17/10
[52] U.S. Cl. .................. 384/113; 384/123; 384/130; 384/381
[58] Field of Search .................. 384/113, 121, 384/115, 381, 380, 123, 292, 130

[56] References Cited

U.S. PATENT DOCUMENTS

| | | | |
|---|---|---|---|
| 5,018,881 | 5/1991 | Asada | 384/113 |
| 5,052,822 | 10/1991 | Van Beek | 384/123 |
| 5,120,139 | 6/1992 | Asada et al. | 384/113 |
| 5,370,463 | 12/1994 | Asada et al. | 384/113 |

Primary Examiner—Lenard A. Footland
Attorney, Agent, or Firm—Flehr, Hohbach, Test, Albritton & Herbert; James A. Sheridan

[57] ABSTRACT

The present invention includes four sections or partitions: two thrust bearings which are formed by the sides of a grooved thrust plate and corresponding countersurfaces, the thrust bearings designed to cause fluid flow in a single direction up around the rotating thrust plate and upward along the surface of a rotating journal, and two journal bearings formed side-by-side on the journal formed between a rotating shaft and a bushing with multiple spiral-grooved sections being formed on the rotating shaft or in the stationary bushing. The two journal bearings are separated by a circumferential groove in the shaft which is connected by a radial bore to a hollow reservoir in the shaft for providing fluid to the journal bearing and the thrust bearing. By providing this bore and a second bore located near to the thrust bearing, the boundary conditions for the combined journal bearings and thrust bearings are fixed and a stable rotating shaft is achieved.

24 Claims, 9 Drawing Sheets

SINGLE PLATE HYDRODYNAMIC BEARING WITH SELF-BALANCING FLUID LEVEL AND FLUID CIRCULATION

FIELD OF THE INVENTION

The present invention relates to the field of hydrodynamic bearing assemblies of the type which provide support and rotation for high speed spindle element. More specifically, the present invention relates to hydrodynamic bearing assemblies utilized in the computer disc drive recording system.

RELATED APPLICATIONS

This application is related to and may be used in common with the invention disclosed in Ser. No. 08/279,194 entitled "Device for Manufacturing a Groove Bearing", inventor: Clark et al, Ser. No. 08/278,796 entitled "Squeeze Film Damping for a Hard Disc Drive", inventor: Jennings et. al, Ser. No. 08/299,195 entitled "Hub Disc Assembly With Integrated Air-bearing", inventor: H. Leuthold et. al, as well as Ser. No. 08/279,199 entitled "Single Plate Hydrodynamic Bearing With Self-Balancing Fluid Level", inventor: Hans Leuthold et al., all of said applications filed Jul. 22, 1994 and being assigned to the assignee of the present invention and incorporated herein by reference.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle and the other near the bottom. These bearings allow for rotational movement between the shaft and the hub while maintaining accurate alignment of the spindle to the shaft. The bearings themselves are normally lubricated by grease or oil.

The conventional bearing system described above is prone, however, to several short comings. First is the problem of vibration generated by the balls rolling on the raceways. Ballbearings used in hard disk drive spindles run under conditions that generally guarantee a physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the datatrack density and the overall performance of the disc drive system.

Another problem is related to the application of hard disk drives in portable computer equipment and the resulting requirements in shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant draw back since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferro-magnetic fluids, or even air have been utilized for use in hydrodynamic bearing systems. The reason for the popularity of the use of air, is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Thus, in the case of a hydrodynamic bearing employing a liquid lubricant, the lubricating fluid and its components must be sealed within the bearing to avoid loss of lubricant which results in reduced bearing load capacity. Otherwise, the physical surfaces of the spindle and housing could contact one another, leading to increased wear and eventual failure of the bearing system. Equally seriously, loss of a seal or failure to control the fluid level within the bearing system could cause contamination of the hard disk drive with lubricant particles and droplets as well as outgassing-related condensation.

It is a further important problem that start-stop cycles and load exceeding the bearing capacity result in wear-and-tear of the bearing surface. This creates particles which are free to move in the lubrication film and which will act as slurry, thus accelerating said wear-and-tear.

A further difficulty with prior art designs of liquid lubrication hydrodynamic bearings is that frequently voids or gas bubbles may occur in the bearing area thereby reducing the effective bearing surface and the related load capacity.

Yet another difficulty of known hydrodynamic bearing designs is their sensitivity to both machining tolerances and the temperature ranges across which they must be operable. Both of these issues are critical in hydrodynamic bearings because of the very narrow gaps between the rotating and stationary parts which must be maintained so that the fluid is effective in lubricating the bearing surfaces, while the tolerance between the bearing surfaces is not so great as to allow tilting of the rotating disks supported by the rotating spindle motor out of the horizontal plane. Thus, it is clear that a number of considerations must be balanced in designing an effective hydrodynamic bearing spindle motor for use in a disk drive.

SUMMARY OF THE INVENTION

It is therefore an objective of the present invention to provide a hydrodynamic bearing which is simple and highly adaptable and scalable for use within an information storage unit such as a computer disk drive system.

It is a further purpose of the present invention to provide a hydrodynamic bearing in which the fluid level and sealing of the fluid within the hydrodynamic bearing is controlled in order to avoid potential contamination of the hard disk drive by lubricant particles and droplets, as well as outgassing-related condensation.

It is a related objective of the present invention to provide a hydrodynamic bearing in which the fluid circulation is controlled and directed so that wear-and-tear on the bearing surface is minimized; it is further an objective that the circulation be adapted to wash off particles out of the bearing surface into the reservoir area.

A further related objective of the present invention is to provide for fluid circulation within the hydrodynamic bearing that minimizes the possibility of voids within the lubricant that could lead to unnecessary wear, and further that maintains and replenishes the lubricant within the bearing from an appropriately located reservoir so that a film of lubricant is maintained within the bearing.

Another objective of the present invention is to provide a bearing design with optimized forced boundary conditions between the various sections of the bearings to optimize the fluid flow and increase the insensitivity to temperature and machining tolerances, providing a greater consistency of the dynamic performance of the invention.

In summary, the present invention includes four sections or partitions: two thrust bearings which are formed by the sides of a grooved thrust plate and corresponding counter-surfaces, the thrust bearings designed to cause fluid flow in a single direction up around the rotating thrust plate and upward along the surface of a rotating journal, and two journal bearings formed side-by-side on the journal formed between a rotating shaft and a bushing with multiple spiral-grooved sections being formed on the rotating shaft or in the stationary bushing. The two journal bearings are separated by a circumferential groove in the shaft which is connected by a radial bore to a hollow reservoir in the shaft for providing fluid to the journal bearing and the thrust bearing. By providing this bore and a second bore located near to the thrust bearing, the boundary conditions for the combined journal bearings and thrust bearings are fixed and a stable rotating shaft is achieved.

Other features and advantages of the present invention will become apparent to a person of skill in the art who studies the following derailed description of a preferred embodiment, given in conjunction with the accompanying drawings.

DETAILED DESCRIPTION OF A PREFERRED EMBODIMENT

A spindle motor and disc assembly for use in disc drive computer systems is disclosed herein. The special purpose of the present invention is to modify the design of a spindle motor incorporating a hydrodynamic bearing for the main rotating shaft for use in a hard disc drive application so that the lubrication fluid does not contaminate the inside of the hard disc drive with particles, droplets or outgassing. A major concern in the design of a hydrodynamic hard disc drive spindle is to make sure that the lubricant or fluid stays confined to the region where it lubricates the rotating surfaces, and cannot migrate toward the regions where the data storing discs are located.

Figure 1:
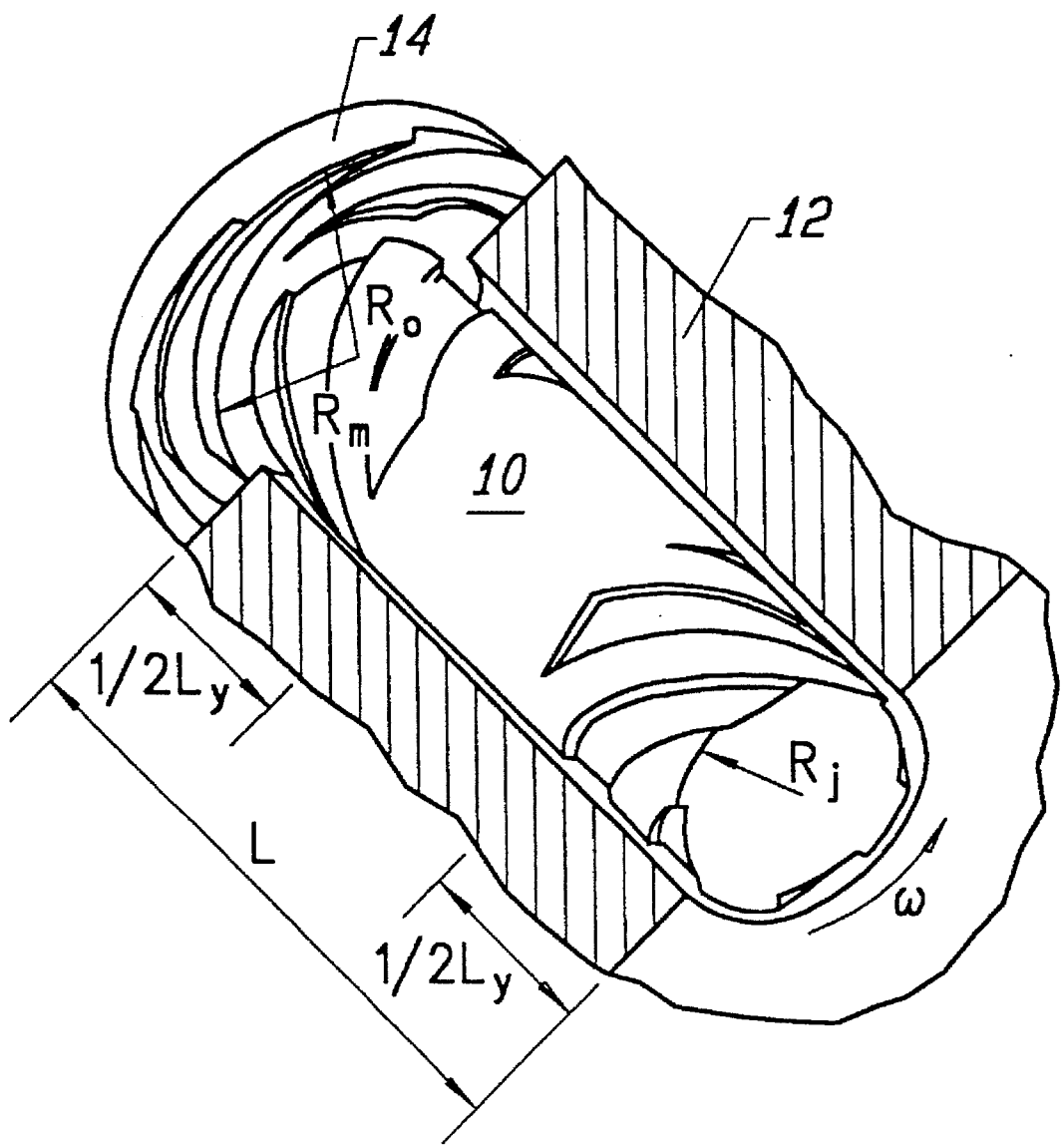
FIG. 1 is an illustration useful in demonstrating the principles of operation of a hydrodynamic bearing.

The basic principle of the present invention is based on a hydrodynamic bearing as already known in the technology, an example of which is shown in FIG. 1. As shown herein, a journal bearing built upon a shaft 10 rotating inside a bushing 12, one of the opposing two surfaces (in this case the shaft) carrying cylindrical sections of spiral grooves. A thrust plate 14 may also be provided with concentric spiral groove sections. The rotation of the shaft churns and pumps the fluid as a function of the direction, width, and angle of the grooves with respect to the sense of rotation. The pumping action builds up multiple pressure zones along the journal and the thrust plates, maintaining a fluid film between the rotating parts, and providing the stiffness of the bearing.

Obviously, with such rotation and pumping and churning of the fluid, the chance for fluid to spill out of the end of bearing is always present. This was the origin and impetus for the present invention.

Figure 2:
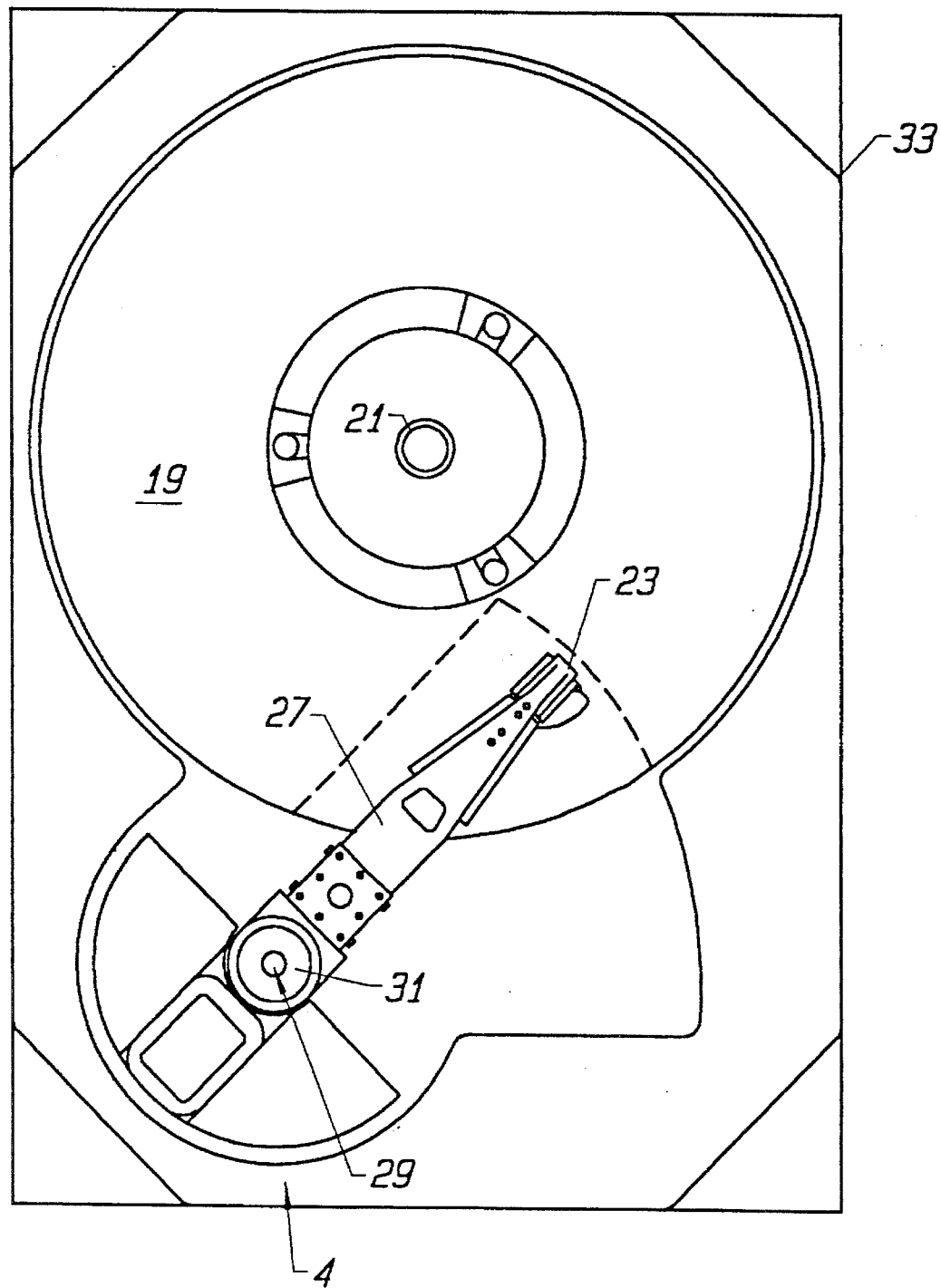
FIG. 2 is a top plan view of a disc drive in which the present invention is useful.

In the following description, numerous specific details are set forth such as material types, thickness, speeds in order to provide a thorough understanding of the invention. It will be obvious, however, to one of skill in the art that these specific details need not be used to practice the present invention. In other instances, well known structures and processing steps have not been described in particular detail in order to avoid unnecessarily obscuring the present invention. Thus, referring next to FIG. 2, this FIG. is a top plan view illustrating the basic element of a disc drive including the rotating disc or discs 19 which are rotated by the spindle 21 of a spindle motor (not shown). As the discs rotate, a transducer 24 mounted on the end of an actuator arm 27 is selectively positioned by a voice coil motor 29 rotating about a pivot 31 to move the transducer 23 from track to track over the surface of the disc. All of these elements are mounted in a housing 33 which is typically an air-tight housing to minimize the possibility of any contaminants reaching the surface of the disc. Such contaminants could interfere with the reading and writing of data on the surface of the disc by the transducer, the transducer itself having an extremely fine gap at which reading/writing occurs, and in today's technology flying extremely close to the surface of the disc. A typical spindle motor for providing constant high-speed rotation to the disc mounted thereon is shown in vertical section in FIG. 3.

This figure shows only a single disc 19 supported from the spindle or hub 21; obviously a significant number of discs could be supported from the hub of a motor of this type here. The figure is intended to show, for the sake of comparison, both the old and the new approach to bearing supports for a rotating shaft type of motor. Therefore, both the right and left hand portions of the figure show a magnet 24 supported on the interior vertical surface of the cavity defining hub element 30. A stator 26 is supported by the sleeve 40 which is adapted to be fitted into a base of the housing 34 at its lower end. On the right hand side standard mechanical bearings 44, 48 support the rotating shaft 52 for rotation about the central axis 52. Obviously the top horizontal portion of the hub 54 and the vertical disc supporting portion of the hub 30 rotate with this shaft. Meanwhile, the outer race 60 of each bearing supports the sleeve which in turn supports the stator on an external surface thereof. The energization of the stator to cause rotation of the hub by interaction of the stator with the magnet 24 is caused by controlled electrical signals provided on wires 62 to the coil windings.

Figure 3:
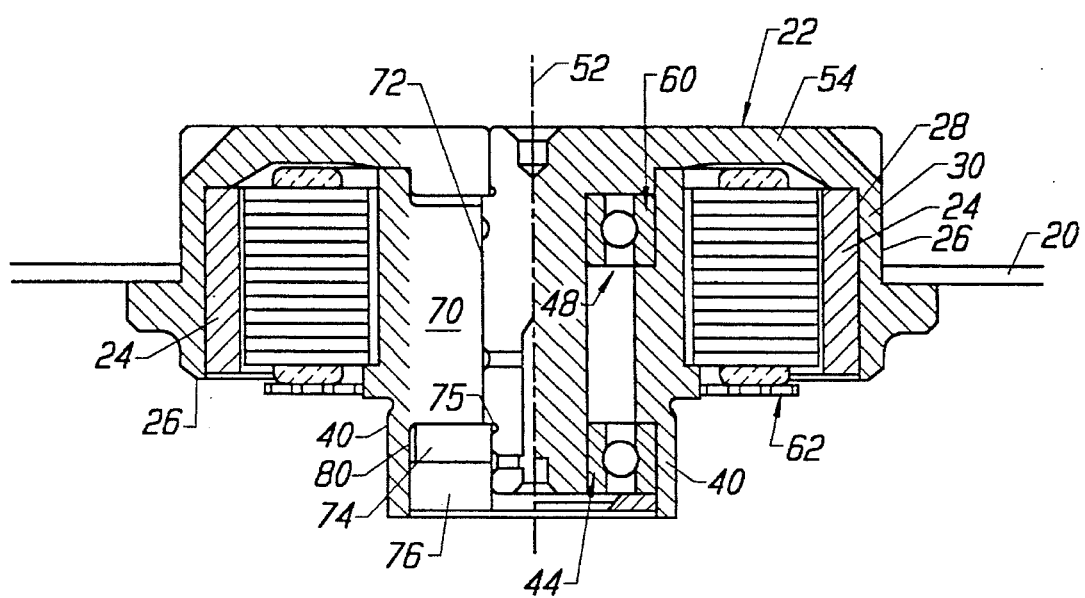
FIG. 3 is a vertical sectional view of a motor incorporating the hydrodynamic bearing of the present invention.

The left hand view of FIG. 3 shows the basic elements of the hydrodynamic bearings of the present invention. In this case, rather than finding ball bearings 48 and 44 supporting the interior surface of the sleeve, the sleeve is a single solid stationary piece 70 which on its interior surface 72 forms the bushing of the journal bearing. This bushing 72 faces the shaft 52 which is rotating past the fixed bushing.

At the lower end of the rotating shaft 52 near the base of the disc drive, a thrust plate 74 is stepped into the shaft near its lower end, and extends into a recess defined by the lower end of the bushing 72 and the upper surface of counterplate 76. This counterplate 76 to the thrust plate 74 is preferably pressed in place against the lower portion 40 of the sleeve, or sits against a step in the bushing in order to fix its position.

Figure 4:
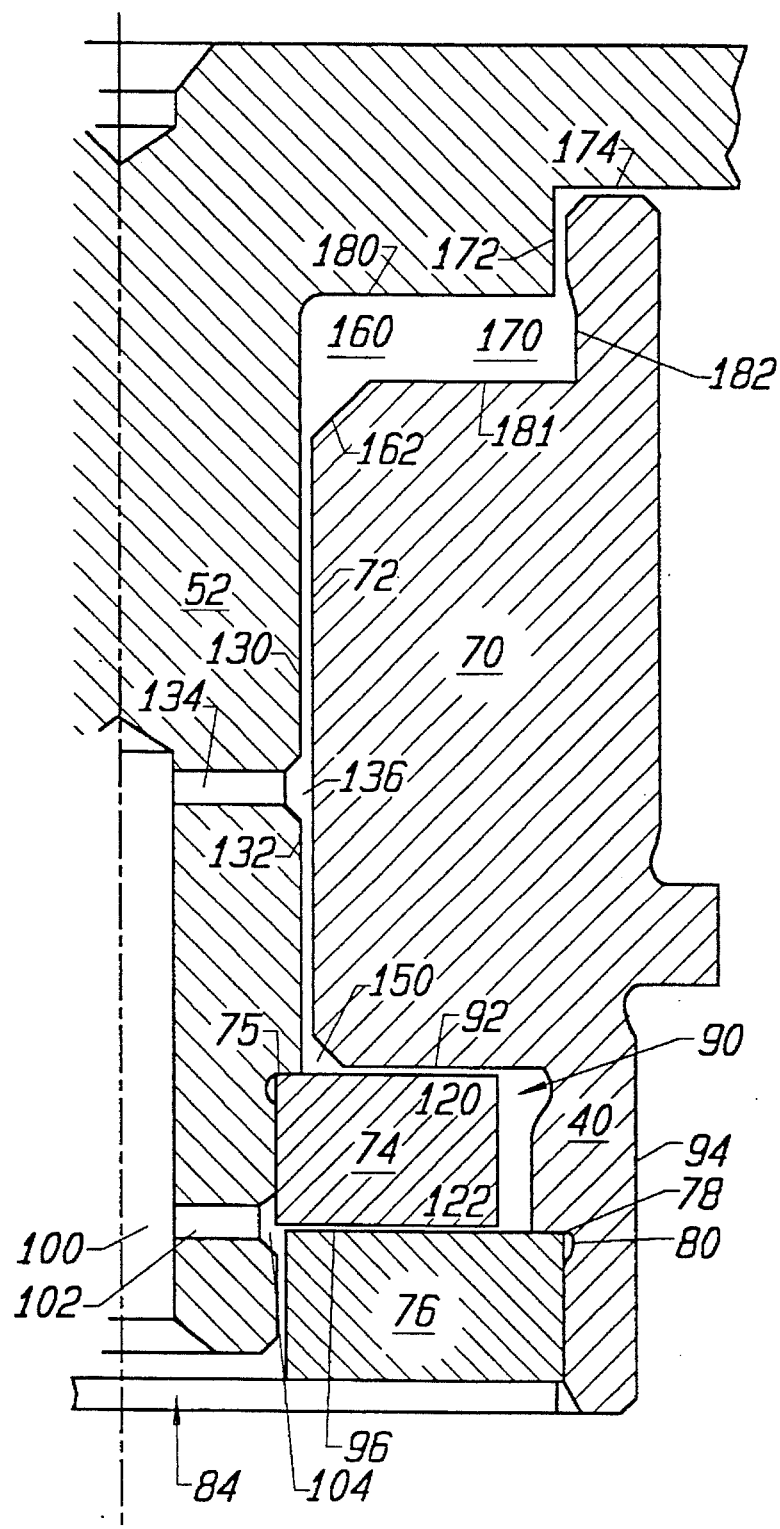
FIG. 4 is a detailed view of a section of the hydrodynamic bearing of the motor of FIG. 3.

The details of the present invention, and especially the placement of the elements and the gaps defined thereby, can best be understood hereafter by reference to FIG. 4, which is an enlarged view of the details of the hydrodynamic bearing shown on the left-hand side of the motor of FIG. 3. It can be seen, referring to the counterplate 76, that a small recess 80 is provided in the lower inner portion of the stationary sleeve 70 to allow the counterplate 76 to be stepped into place. It should be noted that the location of this step 78 in the sleeve for locating the counterplate is important, as the axial location of the counterplate 76 will define the sum of the gaps in the lower thrust bearing for a given thrust plate 74 thickness.

Figure 5:
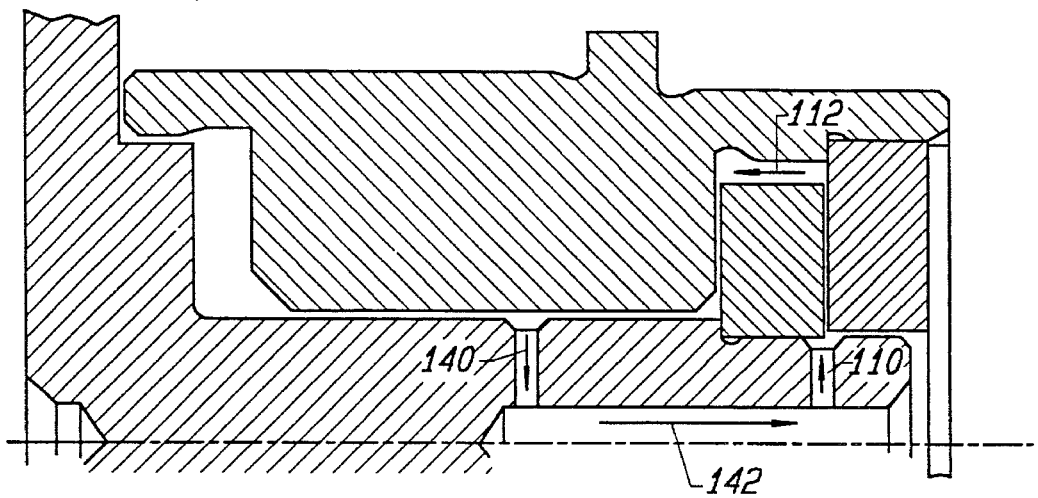
FIG. 5 is a sectional view similar to FIG. 4 useful in illustrating the fluid circulation path in the hydrodynamic bearing of the present invention.

Immediately below the counterplate 76 is located a shield 84 which is provided to close the bearing assembly from the outside. Obviously, although not shown herein, the lower outer portion of the sleeve could be inserted in the base casting of the disc drive in order to securely hold the entire spindle motor in a precise location and orientation. Returning to the lower thrust bearing, it is clear that since the thrust plate 74 is rotating in a recess 90 defined by the bushing 70 on its upper side, the sleeve 40 to the side, and the counterplate 76 at the lower end, these positions must all be securely fixed as the gaps are very fine. The thrust bearing thus comprises the gap 92 between bushing 72 and thrust plate 74, the gap 94 between sleeve 40 and thrust plate 74, and the gap 96 between thrust plate 74 and counterplate 76, all defined by the axial force equilibrium resulting from thrust forces or lifts created in gaps 92 and 96 and any external axial force applied to the shaft with respect to the sleeve. Generally speaking, the direction of fluid flow through the bearing will be from the reservoir 100 through the lower equilibrium groove 104 and radial bore 102, which is shown immediately adjacent the thrust plate 74 and the counter plate 76. Bore 102 and groove 104 connect the inner boundary of the lower thrust bearing to the reservoir 100, forcing an ambient pressure boundary condition. If the gap around the lower portion of the shaft, specifically between shaft and counterplate 76 and shaft and shield 84 is large enough, it satisfies the requirements on bore 102, which in turn may be left out. The circulating fluid will enter the thrust bearing through the radial bore 102 from the center bore reservoir 100, and circulate through the gaps 96, 94, 92 toward the middle equipressure groove 150 in the direction indicated by the arrows 110, 112 in FIG. 5. This fluid circulation and pressure definition is enhanced by a herringbone pattern pressed or otherwise defined on the upper and lower surfaces 120, 122 of the thrust plate 74 as will be described more fully below.

Figure 8:
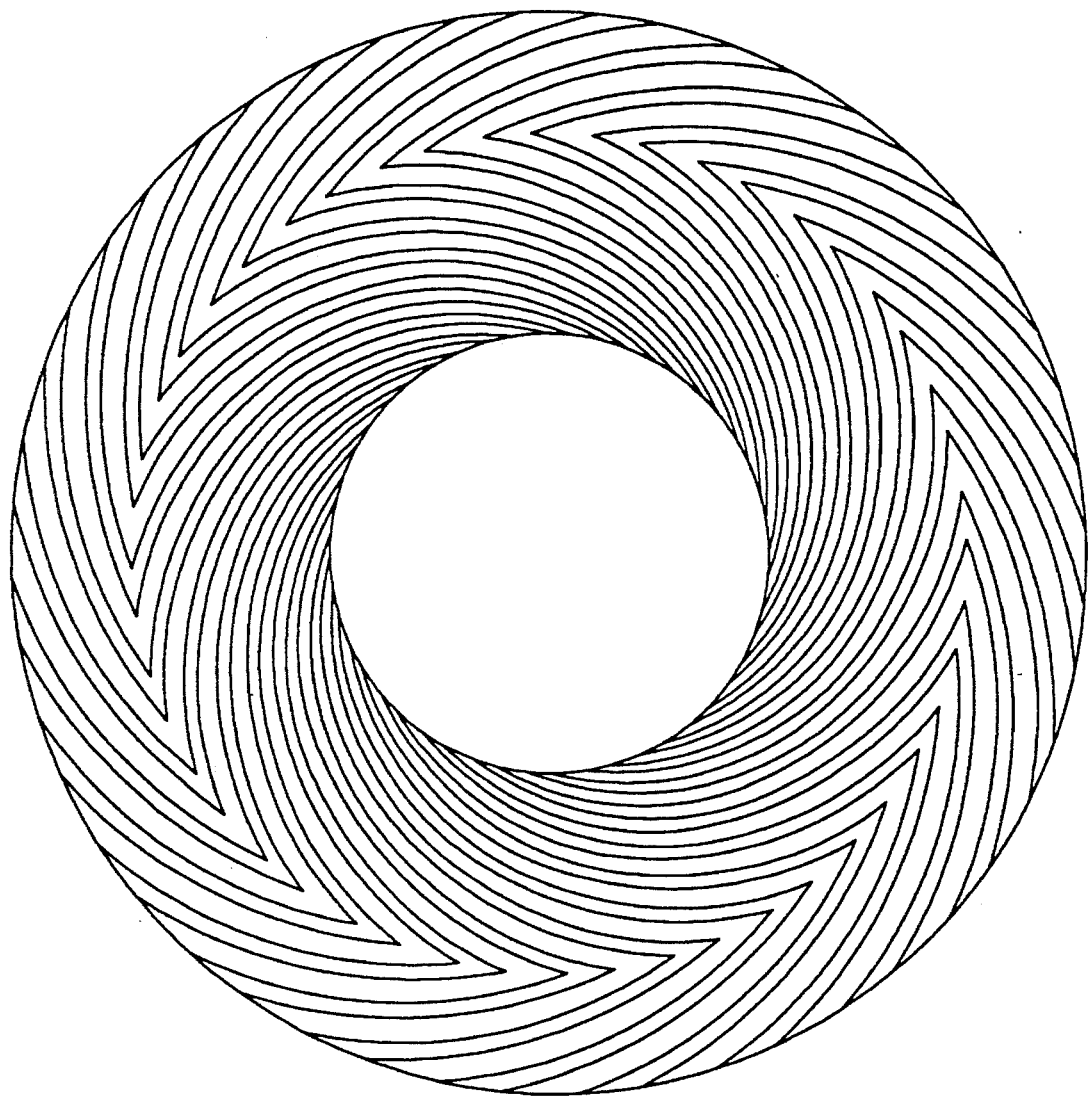
FIG. 8 shows the herringbone pattern used on the thrust bearing attached to the lower portion of the rotating shaft in the present invention.

The development of these pressure differentials is enhanced by the use of a herringbone pattern such as shown in FIG. 8 on the surfaces 120, 122 of the thrust bearing and specifically on the thrust plate rotating surfaces; the orientation of the apparent herringbone pattern being identified if one could see through the thrust plate.

The fluid circulation and necessary pressure differentials are further created by the use of upper and lower journal bearings defined between the rotating shaft 52 and the bushing 72 or sleeve 70. Alternate embodiments with spiral grooves defined on the shaft instead of on the bushings are possible without significantly altering the behavior of the design. The upper and lower journal bearings 130, 132 are separated by equipressure groove 136 and bore 134 in the rotating shaft 52 adjacent the bushing 72. The upper and lower journal bearings 130, 132 are further defined by a herringbone pattern comprising multiple (at least 2) spiral-groove axial sections pressed or otherwise defined into the surface of the bushing 72 or sleeve 70. The geometry of this pattern is such, as will be described further below with respect to FIGS. 6 and 7, that relative motion between the fluid and the sleeve 70 surface will build up a positive pressure with respect to both ends of the bearing, thereby enhancing the desired fluid circulation represented by arrows 140, 142 of FIG. 5 and maintaining the fluid within the journal bearing rather than allow it to escape into the region of the support for the hard disk drives.

The upper journal bearing 130 is also defined between the rotating shaft 52 and sleeve 70, and has a similar groove pattern as described with respect to the lower journal bearing—that is, comprising a herringbone pattern—such that positive pressure is built up and established with respect to both ends of the bearing.

As previously mentioned, the path of the circulation of the fluid through the journal bearing and the thrust bearing includes an equipressure groove 136 and a radial bore 134, and a reservoir 100 which comprises a center bore in the rotating shaft, filled with lubricant. If gas bubbles or a void should appear in the fluid, they will be trapped in this center bore due to the centrifugal force differential between the heavier circulating fluid and the lighter bubble, thereby diminishing the prospect of a bubble or void appearing in one of the thrust or journal bearings. This quality is especially important during the assembly process where it is used to fill and bleed the bearing properly.

It should also be noted that the radial thrust plate gap 94 adjacent the end of the radial thrust plate 74 and between that end and the sleeve 70, is also filled with lubricant. Microscopic metal particles created by wear-and-tear in the bearing will be trapped in this cavity 94 due to the centrifugal force differential between the lighter circulating fluid and the heavier metal particles. The cavity is large enough to enforce an infinite manifold boundary condition between the two thrust bearings defined in gaps 92, 96.

The upper equipressure groove 136 and radial bore 134 connect the upper boundary of the lower journal bearing 132 and the lower boundary of the upper journal bearing 130 to the reservoir 100, thus enforcing an ambient pressure boundary condition. The circulating fluid thus can leave the journal bearings through the radial bore and travel into the center bore reservoir 100 in order to maintain proper fluid circulation. A middle equipressure groove 150 is also provided at the junction or intersection between the lower journal bearing 132 and the upper thrust bearing 92. This groove is filled with lubricant and is large enough to enforce an infinite manifold boundary condition between the upper thrust bearing and lower journal bearing.

The hydrodynamic bearing of the present invention further includes a capillary seal 160 which is the radial gap between the rotating shaft 52 and the sleeve 70, one of the two facing surfaces of these two items having a progressively increasing width as shown here at 162. The capillary action due to the surface tension in the fluid prevents the fluid in the hydrodynamic bearing from spilling out of the bearing in a standstill condition. The bearing further includes a gas trap 170. As noted above, the shield 84 inhibits any net fluid or gas flow through the bearing assembly. However, gases may still leave the fluid at the upper boundary of the upper journal bearing. Further, lubricant droplets created under excessive shock may also be defined, and are collected in this same gas trap 170. The ability to prevent exiting of particles or gases from the hydrodynamic bearing is further enhanced by a labyrinth seal 172 formed by the curved walls of the hub 174 rotating over the upper extent of the sleeve 70. This labyrinth forms a further barrier in the path between the head disk assembly and the gas trap 170 defined below.

As a further protection, the lower surface of the hub 180 and the vertical surface 181 of the stationary sleeve support barrier coatings. These coatings on the surfaces delimiting axially the gas trap 170 should be coated with a non-wetting material to prevent fluid creep from the bearing into the gas trap.

The outer circumferential surface 182 of the gas trap, defined by an inner surface of the sleeve, is also coated with absorbent material or holds a ring of absorbent material on the surface thereof, to eliminate condensing gases and bind droplets accumulating in the gas trap 170.

Figure 6:
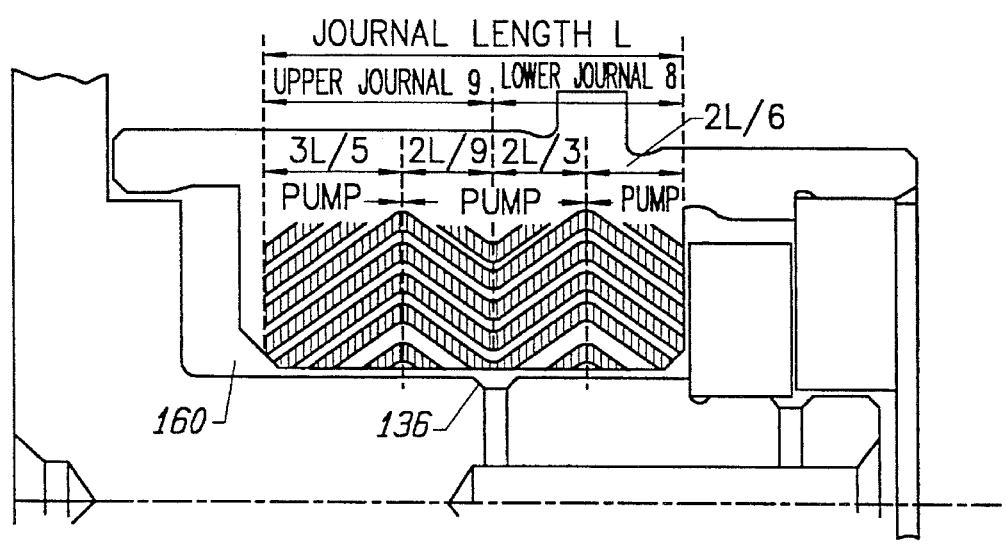
FIG. 6 is a sectional view similar to FIG. 4 useful in illustrating the journal grooving pattern of the hydrodynamic bearing of FIG. 4.
Figure 7:
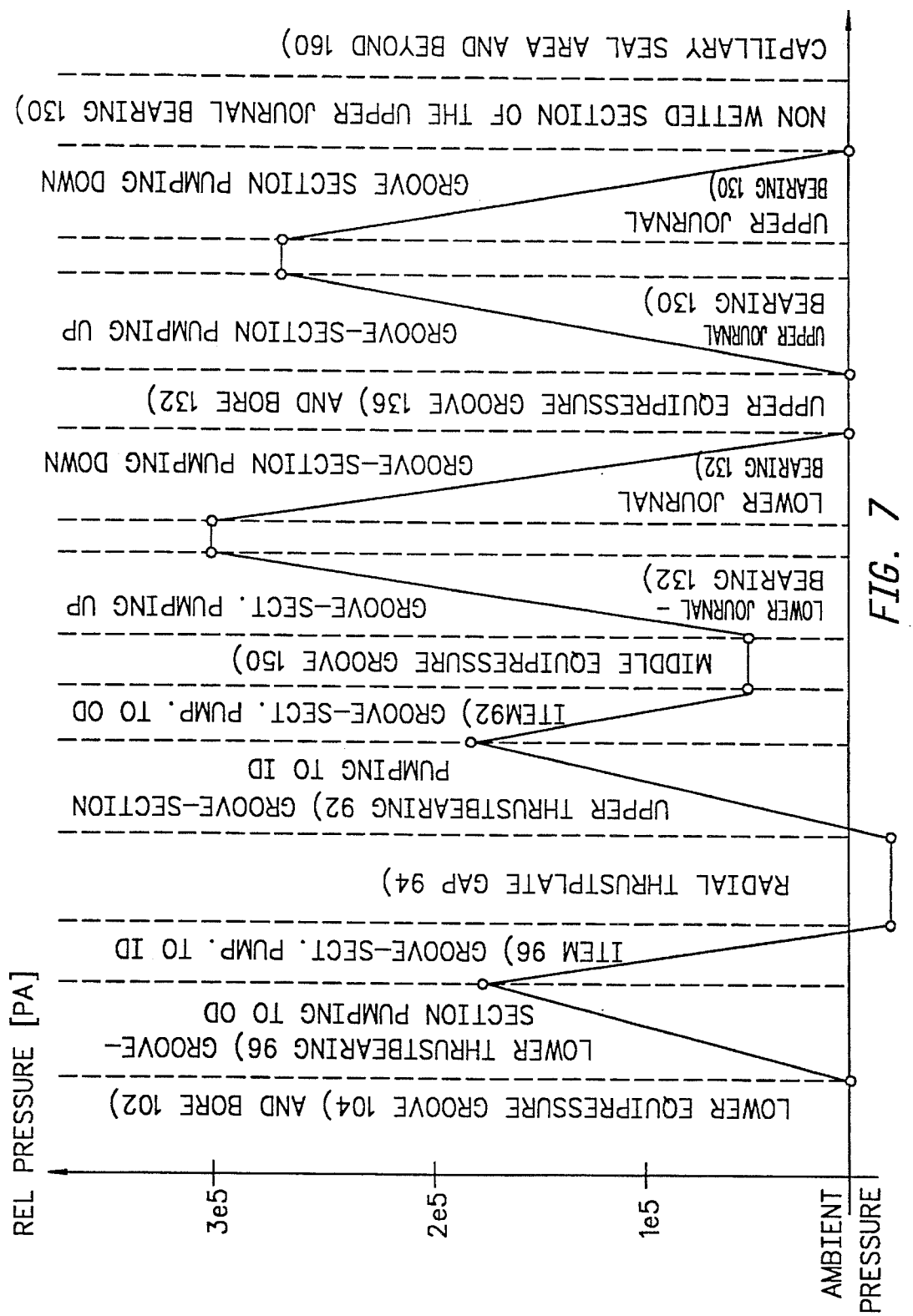
FIG. 7 is a illustration of the pressure gradient distribution achieved in the hydrodynamic bearing shown in FIG. 4.

Finally, referring to FIGS. 6 and 7, FIG. 6 shows the journal grooving pattern on the surface of the stationary sleeve or bushing 72 facing the rotating shaft. FIG. 7 shows the pressure distribution throughout both the journal bearing and the upper and lower thrust bearings. The upper journal bearing 130 is defined by the herringbone pattern comprising two axial sections of spiral grooves defined on the sleeve surface of the bearing. The lower grooved section is bounded by the upper equipressure groove 136 and pumps fluid toward the capillary seal 160. The upper grooved section is bounded by the capillary seal 160 and pumps fluid away from that seal. In order to achieve fluid level balancing, the upper grooved section is considerably longer than the lower one, as shown in FIG. 4 where the grooved sections have approximately 3:2 ratio, and the direction of pumping is clearly illustrated. Thus, the dominant direction of pumping in the upper journal will be toward the bore 134, while the pumping effect in the lower journal will be relatively balanced. If the wetted sections of the bearings containing the fluid covers an equal surface of each of the upper and lower grooved sections, the fluid level remains constant since the bearing is bounded on both sides at ambient pressure. If the fluid level increases, covering more of the upper grooved section, a net force will create a fluid movement evacuating the upper grooved section until the balance is restored. If the fluid level decreases, the opposite action appears. Thereby the wetted surface of the hydrodynamic bearing is constantly maintained under the present design.

It should also be noted that the thrust plate 74 is sitting against a step 75 in the rotating shaft 52. This reduces the grooved surface which is apparent to the bearing on the upper thrust bearing 96 with respect to the lower thrust bearing 92. Thus, the net force from bearing 96 toward bearing 92 is created, establishing the fluid flow direction in the direction of the arrow 112 shown in FIG. 5.

Figure 9A:
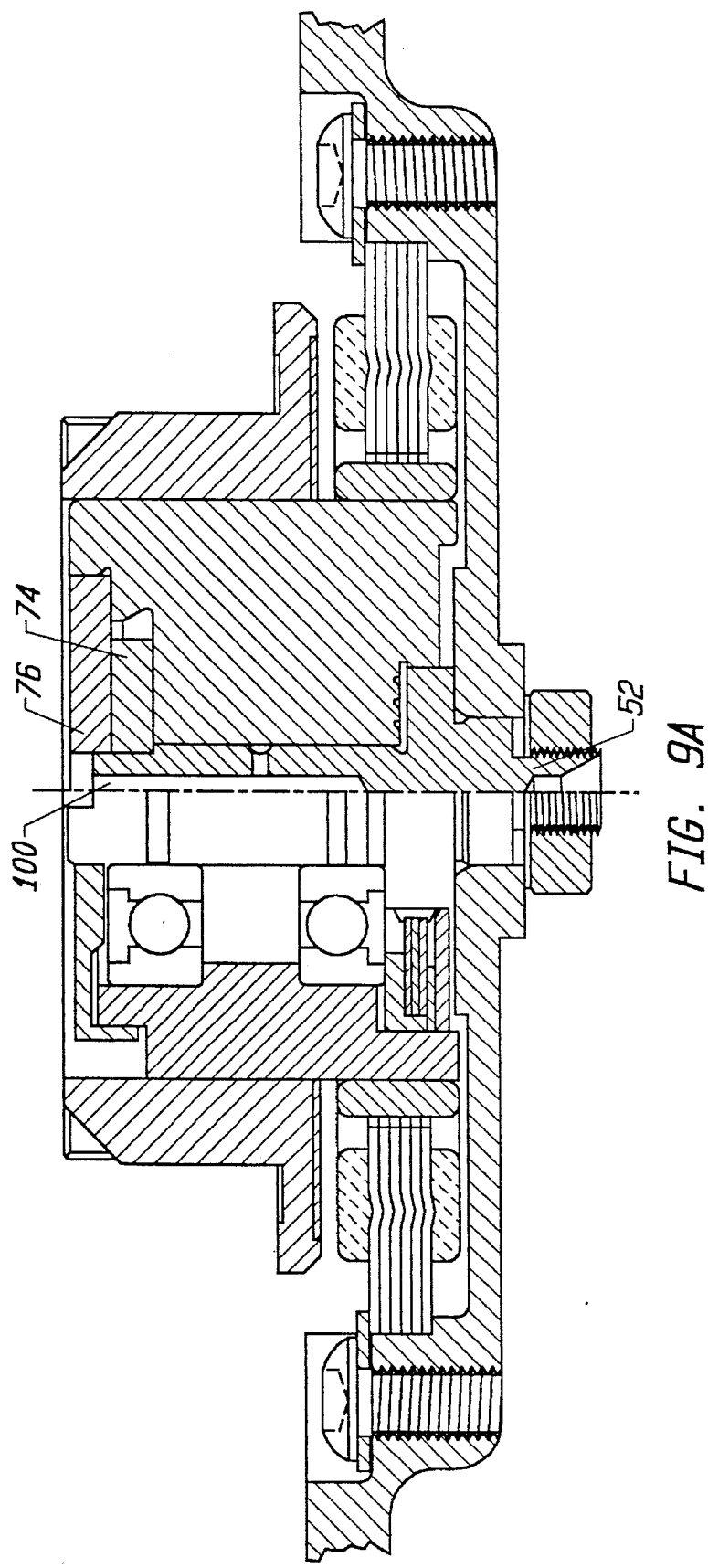
FIGS. 9A and 9B are vertical sectional views of alternative embodiments of this invention utilizing a fixed shaft.
Figure 9B:
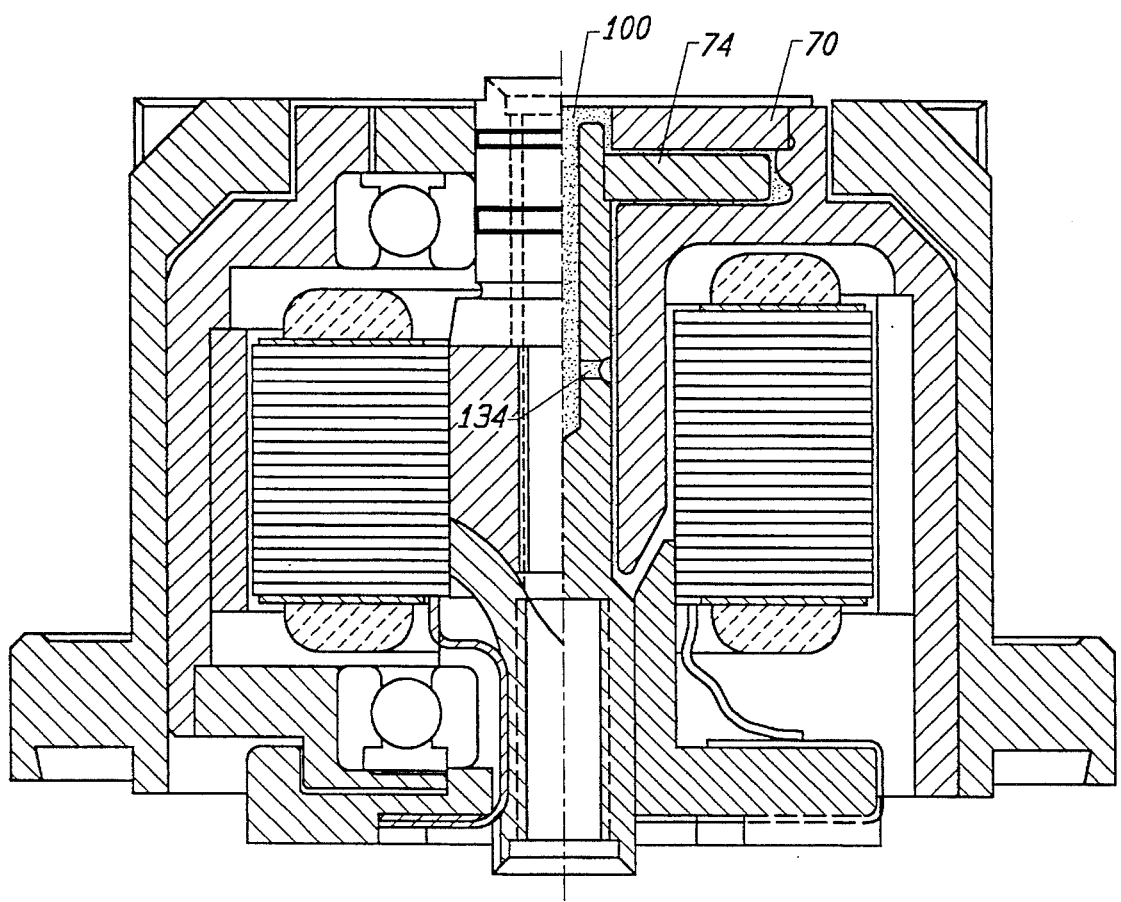

Other features and advantages of the present invention may become apparent to a person of skill in the art who studies the present invention disclosure. For example, the herringbone pattern, although the journal bearing's herringbone pattern is preferably on the sleeve of the bearing, it can be on the shaft as well. Also, the design principles of the present invention can be applied to a stationary shaft motor as well. In such a design (see FIGS. 9A and 9B), the sleeve 70 and hub 54 would rotate; the shaft 52 and thrust plate 74 would be stationary. The bore 102 adjacent the thrust bearing 74 would typically not be present; rather the fluid would come out the top of the reservoir 100 and move between the counterplate 76 and shaft 52 into the thrust bearing gap. Therefore, the scope of the present invention is to be limited only by the following claims.

What is claimed is:

1. A spindle comprising an electromagnetic motor and a bearing system, said bearing system comprising a sleeve and a shaft fitted into an axial bore or bushing of said sleeve, said shaft and said bushing rotating freely relative to each other, said shaft defining together with said bushing a journal bearing; said shaft further supporting an annular thrust plate, said thrust plate extending into a recess formed by an axial face stepped into said sleeve and a counterplate parallel to said thrust plate and attached to said sleeve, and said axial face defining together with the adjacent thrust plate surface a first thrust bearing, and the gap between said thrust plate and said counterplate forming a second thrust bearing, both thrust bearings opposing each other; furthermore, said counterplate defining a bore concentric to said shaft, said shaft ending within said bore of said counterplate, said bore in said counterplate being closed off by a shield on the side opposing the stump of said shaft, thus creating a fluid filled bearing system which is open only on one end; said shaft further comprising an axial center bore serving as a reservoir for fluid for said fluid filled bearing system, said center bore communicating with said journal bearing through a first radial bore terminating adjacent said bushing defining said journal bearing, and with said thrust bearing through a flowpassage defined by gaps around said shaft stump of the shaft of by a second radial bore in said shaft terminating adjacent to said second thrust bearing.

2. A spindle as claimed in claim 1 wherein said first bore divides said journal bearing into first and second journal bearings, each of said first and second journal bearings having at least a two-section herringbone pattern for creating a positive pressure differential from the boundaries towards the center said journal bearing.

3. A spindle as claimed in claim 2 wherein said first journal bearing has a greater net grooved surface directing fluid flow toward said first radial bore than the net grooved surface defined by said herringbone pattern directing fluid flow away from said first radial bore.

4. A spindle as claimed in claim 1 wherein a first end of said journal bearing distal from said annular thrust plate terminates in a capillary seal formed between said bushing integral with said sleeve and said shaft of said motor.

5. A spindle as claimed in claim 4 wherein said surfaces of said bushing and said shaft where said capillary seal is formed are inclined away from each other to aid in the formation of said capillary seal.

6. A spindle as claimed in claim 4 including a gas trap defined by a horizontal surface of said bushing and said sleeve and a horizontal surface of said hub beyond said capillary seal for containing any fluid droplets condensation or gases in the bearing assembly.

7. A spindle as claimed in claim 6 further comprising a labyrinth seal located beyond said gas trap and said capillary seal and defined between an extended surface of said sleeve and an inner surface of said hub for forming a barrier in a path between the capillary seal and the gas trap and the atmosphere surrounding a disc in said head disc assembly.

8. A spindle as claimed in claim 1 having said first axial surface fixed against a recessed step in said shaft so that the net exposed wetted surface of the first thrust bearing is less than the net exposed wetted surface of the second thrust bearing, whereby the net fluid flow established around said thrust plate is from said second thrust plate surface toward said first thrust plate surface and thereby toward an end of said journal bearing.

9. A spindle comprising an electromagnetic motor and a bearing system, said bearing system comprising a shaft fitted into a sleeve or bushing with a liquid lubricant in between, said shaft and said bushing or sleeve rotating freely relative to one another, said shaft defining together with said bushing a journal bearing, said shaft further supporting an annular thrust bearing extending through a recess defined by said lower surface of said bushing and an upper surface of a counterplate supported from said sleeve to define said recess, and said shaft comprising a center bore serving as a reservoir for fluid for said journal bearing and said thrust bearing, said central bore communicating with said journal bearing through a first bore terminating adjacent said bushing defining said journal bearing; and communicating with said thrust bearing through gaps around a first end of the shaft or through a second bore terminating adjacent said thrust bearing, said counterplate fitted on one side with a shield closing off the bearing and spindle from the outside.

10. A spindle as claimed in claim 9 wherein said first bore divides said journal bearing into first and second journal bearings, each of said first and second journal bearings having at least a two-section herringbone pattern for creating a positive pressure differential from the boundaries towards the center said journal bearing.

11. A spindle as claimed in claim 10 wherein said first journal bearing has a greater net grooved surface directing fluid flow toward said first radial bore than the net grooved surface defined by said herringbone pattern directing fluid flow away from said first radial bore.

12. A spindle as claimed in claim 9 wherein a first end of said journal bearing distal from said annular thrust plate terminates in a capillary seal formed between said bushing integral with said sleeve and said shaft of said motor.

13. A spindle as claimed in claim 12 wherein said surfaces of said bushing and said shaft where said capillary seal is formed are inclined away from each other to aid in the formation of said capillary seal.

14. A spindle as claimed in claim 12 wherein said upper bore terminates in a circumferential equipressure groove connecting the lower boundary of the upper journal bearing to the upper boundary of the lower journal bearing and providing circulating fluid from the bearing through the radial bore into the center bore reservoir, and forcing an ambient pressure boundary condition for said upper and said lower journal bearing.

15. A spindle as claimed in claim 14 including a lower equipressure groove terminating in a radial bore adjacent said thrust bearing or a gap between the counterplate and the shaft and the shaft and the shield and connecting the thrust bearing to the reservoir, and forcing an ambient pressure condition to allow the circulating fluid to enter the thrust bearing through the lower radial bore from the center reservoir.

16. A spindle as claimed in claim 15 including a radial thrust plate gap defined between an outer end of said thrust plate and an inner surface of said sleeve and being wider than the gap defined between either said upper thrust plate surface and said bushing or said lower thrust plate surface and said counterplate and filled with lubricant to trap metal particles in a cavity due to the centrifugal force differential between the circulating fluid and the metal particles.

17. A spindle as claimed in claim 12 further comprising a labyrinth seal located beyond said gas trap and said capillary seal and defined between an extended surface of said sleeve and an inner surface of said hub for forming a barrier in a path between the capillary seal and the gas trap and the atmosphere surrounding a disc in said head disc assembly.

18. A spindle as claimed in claim 17 having said first axial surface fixed against a recessed step in said shaft so that the net exposed wetted surface of the first thrust bearing is less than the net exposed wetted surface of the second thrust bearing, whereby the net fluid flow established around said thrust plate is from said second thrust plate surface toward said first thrust plate surface and thereby toward an end of said journal bearing.

19. A spindle as claimed in claim 18 including barrier coatings comprising a non-wetting material on the horizontal surfaces delimiting the gas trap to prevent fluid creep from the bearing into the gas trap.

20. A spindle as claimed in claim 9 including a gas trap defined by a horizontal surface of said bushing and said sleeve and a horizontal surface of said hub beyond said capillary seal for containing any fluid droplets condensation or gases in the bearing assembly.

21. A spindle as claimed in claim 20 wherein said thrust plate has first and second sides, each supporting a herringbone pattern comprising multiple spiral-grooved sections to form said first or second thrust bearings, the geometry of the patterns being selected so that relative motion between the fluid and the surface will build up a positive pressure between the outer diameter and the inner diameter of the plate surface.

22. A spindle as claimed in claim 21 having said first axial surface fixed against a recessed step in said rotating shaft so that the net exposed wetted surface of the first thrust bearing is less than the net exposed wetted surface of the second thrust bearing, whereby the net fluid flow established around said thrust plate is from said second thrust plate surface toward said first thrust plate surface and thereby toward a lower end of said journal bearing.

23. A spindle as claimed in claim 22 including an equipressure groove formed by a recess at the common junction of said rotating shaft, said bushing of said journal bearing and said upper thrust plate surface of said plate, said equipressure groove being filled with lubricant by said upper thrust bearing and said lower journal bearing.

24. A spindle as claimed in claim 23 wherein said equipressure groove is formed by an inclined surface at the lower outer corner of said bushing adjacent said rotating shaft, and defining a cavity large enough to establish an infinite manifold boundary condition between said upper thrust bearing and said lower journal bearing.

* * * * *

UNITED STATES PATENT AND TRADEMARK OFFICE
CERTIFICATE OF CORRECTION

PATENT NO. : 5,487,608
DATED : January 30, 1996
INVENTOR(S) : Hans Leuthold, David J. Jennings, Wesley R. Clark, Raquib Khan and Gunter Heine It is certified that error appears in the above-indentified patent and that said Letters Patent is hereby corrected as shown below: Title page, item
[75] Inventors, delete "Guenther", insert --Gunter--

Signed and Sealed this

Twenty-eighth Day of July, 1998

Attest:

*Bruce Lehman*

BRUCE LEHMAN

*Attesting Officer*   *Commissioner of Patents and Trademarks*